Patented Apr. 26, 1932

1,856,020

UNITED STATES PATENT OFFICE

HEINRICH BERTSCH, OF CHEMNITZ, GERMANY, ASSIGNOR TO H. TH. BOHME AKTIEN-GESELLSCHAFT, OF CHEMNITZ, GERMANY, A CORPORATION OF GERMANY

METHOD FOR INCREASING THE WETTING AND PENETRATING CAPACITY OF TREATMENT LIQUIDS

No Drawing. Application filed November 11, 1927, Serial No. 232,720, and in Germany May 27, 1927.

This invention relates to a new or improved method for increasing the wetting or penetrating capacity of treatment liquids particularly such as are employed in the textile and leather industries. It has been demonstrated in textile and leather-treatment processes that additions of aqueous solutions or other dispersions of heterocyclic bases to the treatment liquids or baths is effective for increasing the wetting and penetrating powers of such liquids.

According to this invention the wetting and penetrating properties of the heterocyclic bases, and particularly of the water soluble heterocyclic bases such as pyridine, may be considerably increased by the addition of aromatic sulphoacids.

In particular, sulpho acids aliphatically substituted in the nucleus, for example alkylated sulpho acids of the naphthalene group may be employed. A similar effect is produced by the sulpho acids which are derived from the hydroxylized, chlorinated or amidated hydrocarbons, as for example, from the naphtholes, naphthylamines and chloronaphthalenes. However, not only the wetting action of the pyridine bases is increased in a quite extraordinary degree but also the presence of the pyridine bases at the same time enhances materially the dissolving power of the sulpho acids in respect of dye stuffs. Mixtures of the heterocyclic bases with the sulpho acids form a clear solution in water and have, when added to the treatment liquids, a strong wetting effect, thereby shortening the treatment process or enhancing its effect. A suitable preparation is, for example, a mixture of pyridine bases and di-isopropyl-naphthalene-sulpho acids. Further mono or di-butyl naphthalene-sulpho acids may also be adopted for the purpose. Moreover the corresponding sulpho acids of the hydrogenized aromatic polynucleus hydrocarbons and also the products resulting from hydrogen-addition to the heterocyclic bases may be employed.

Some examples are given below:—

Example I 20 kgs. of propyl-naphthalene-sulpho acid is mixed with 30 kgs. of a mixture of water insoluble pyridine homologues alkylated several times and 50 kgs. of water are also added to this mixture. A preparation forming a clear solution in water and with a large capacity for dissolving dye-stuffs and excellent wetting powers is obtained which is employed in the color baths of the textile and leather industries.

Example II 20 kgs. of di-butyl-naphthalene sulpho acid is mixed with 30 kgs. of a mixture of alkylated pyridines and quino-lines and 50 kgs. of water. This preparation also is an excellent wetting agent for the textile and leather industries.

Example III 30 kgs. of iso-propyl-tetrahydro-naphthalene sulpho acid is mixed with 20 kgs. of tetrahydro-quinoline. After the addition of 50 kgs. of water a clear solution of oily consistency is obtained which exhibits an excellent capacity for wetting and for dissolving dye-stuffs.

Preparations obtained by heating the sulpho-acids with the bases have proved to be particularly efficacious, salt-like compounds presumably being formed. For instance 300 kgs. of di-propyl-naphthalene sulpho acid is heated with 100 kgs. of technical pyridine bases for several hours in the oil bath at 140°. A preparation is obtained which is probably to be regarded as the pyridinium salt of the sulpho acid and which displays an especially high power for wetting and penetrating.

I claim:—

1. Treatment bath comprising a treatment liquid and an addition thereto of a mixture of heterocyclic bases and aromatic sulpho acids.

2. Treatment bath comprising a treatment liquid and an addition thereto of a mixture of heterocyclic bases and sulpho acids of the naphthalene group.

3. Treatment bath comprising a treatment liquid and an addition thereto of a mixture of heterocyclic bases and sulpho acids of aromatic naphthalenes aliphatically substituted in the nucleus.

4. Treatment bath comprising a treatment liquid and an addition thereto of a mixture of heterocyclic bases and alkylated sulpho acids of the naphthalene group.

5. Treatment bath comprising a treatment liquid and an addition thereto of a mixture of water soluble heterocyclic bases and aromatic sulpho acids.

6. Treatment bath for fibrous materials comprising a treatment liquid and an addition thereto of a mixture of a sulpho acid of an aromatic polynucleus hydrocarbon and a heterocyclic base substantially as set forth.

7. A bath for use in connection with the dyeing of textiles and leather comprising a treatment liquid and a mixture of heterocyclic bases and aromatic sulpho acids added thereto.

8. A treatment bath containing in addition to a treatment liquid, a mixture comprising a hydrogenated aromatic sulpho acid and a hydrogenated heterocyclic base.

9. A tratment bath containing in addition to a treatment liquid, a mixture comprising a hydrogenated aromatic sulpho acid and a heterocyclic base.

10. A treatment bath containing in addition to a treatment liquid, a mixture comprising an aromatic sulpho acid and a hydrogenated heterocyclic base.

Dr. HEINRICH BERTSCH.